United States Patent [19]

Koster et al.

[11] Patent Number: 4,874,286
[45] Date of Patent: Oct. 17, 1989

[54] MANIPULATOR WITH ROD MECHANISM

[75] Inventors: Marinus P. Koster; Henricus J. J. Bouwens; Anton A. J. Van Tartwijk; Willem L. G. De Peuter, all of Eindhoven, Netherlands

[73] Assignee: U.S. Philips Corporation, New York, N.Y.

[21] Appl. No.: 198,618

[22] Filed: May 20, 1988

Related U.S. Application Data

[63] Continuation of Ser. No. 4,941, Jan. 20, 1987, abandoned.

[30] Foreign Application Priority Data

Jan. 23, 1986 [NL] Netherlands .......................... 8600143

[51] Int. Cl.$^4$ ............................................. B25J 18/00
[52] U.S. Cl. ............................. 414/744.5; 414/744.6; 901/15; 901/23
[58] Field of Search .................. 414/744, 744.1, 744.2, 414/744.5, 744.6; 901/15, 23, 24, 25; 318/568, 568.11

[56] References Cited

U.S. PATENT DOCUMENTS

| | | |
|---|---|---|
| 4,218,173 | 8/1980 | Coindet et al. .................... 901/15 X |
| 4,290,239 | 9/1981 | Zimmer . |
| 4,341,502 | 7/1982 | Makino ............................. 901/15 X |
| 4,518,298 | 5/1985 | Yasukawa ........................ 901/23 X |
| 4,596,509 | 6/1986 | Ise et al. ............................ 901/23 X |
| 4,648,785 | 3/1987 | Nakagawa et al. .............. 414/744 A |
| 4,682,932 | 7/1987 | Yoshino ........................... 414/744 A |
| 4,712,971 | 12/1987 | Fyler ..................................... 901/15 |

FOREIGN PATENT DOCUMENTS 52-31456 3/1977 Japan .

OTHER PUBLICATIONS

Industrieroboter-Mechanische Konstruktion, Spring 1983, Konstruktion, pp. 221-229, Kuka Brochure on Industrieroboter, IR 200/500.

Primary Examiner—Robert J. Spar
Assistant Examiner—Donald W. Underwood

[57] ABSTRACT

The invention relates to a manipulator comprising an end effector (27) displaceable by means of a rod mechanism comprising four arms (11,13,15,17). By means of simultaneously activated individual drives (29,35) for two of the arms (11,15) which are of equal length, which individual drives are integrated in a differential drive, a displacement of the rod mechanism is obtained in a plane at right angles to a main axis (3) about which the two arms (11,15) are rotatable. At the same and oppositely directed angular velocities of the arms (11,15) about the main axis (3), a radial (R) positioning of the end effector (27) takes place, while at the same angular velocities of the arms (11,15) in the same direction an angular ($\theta$) displacement of the end effector (27) about the main axis is obtained. The manipulator is particularly suitable for use as assembling robot.

5 Claims, 3 Drawing Sheets

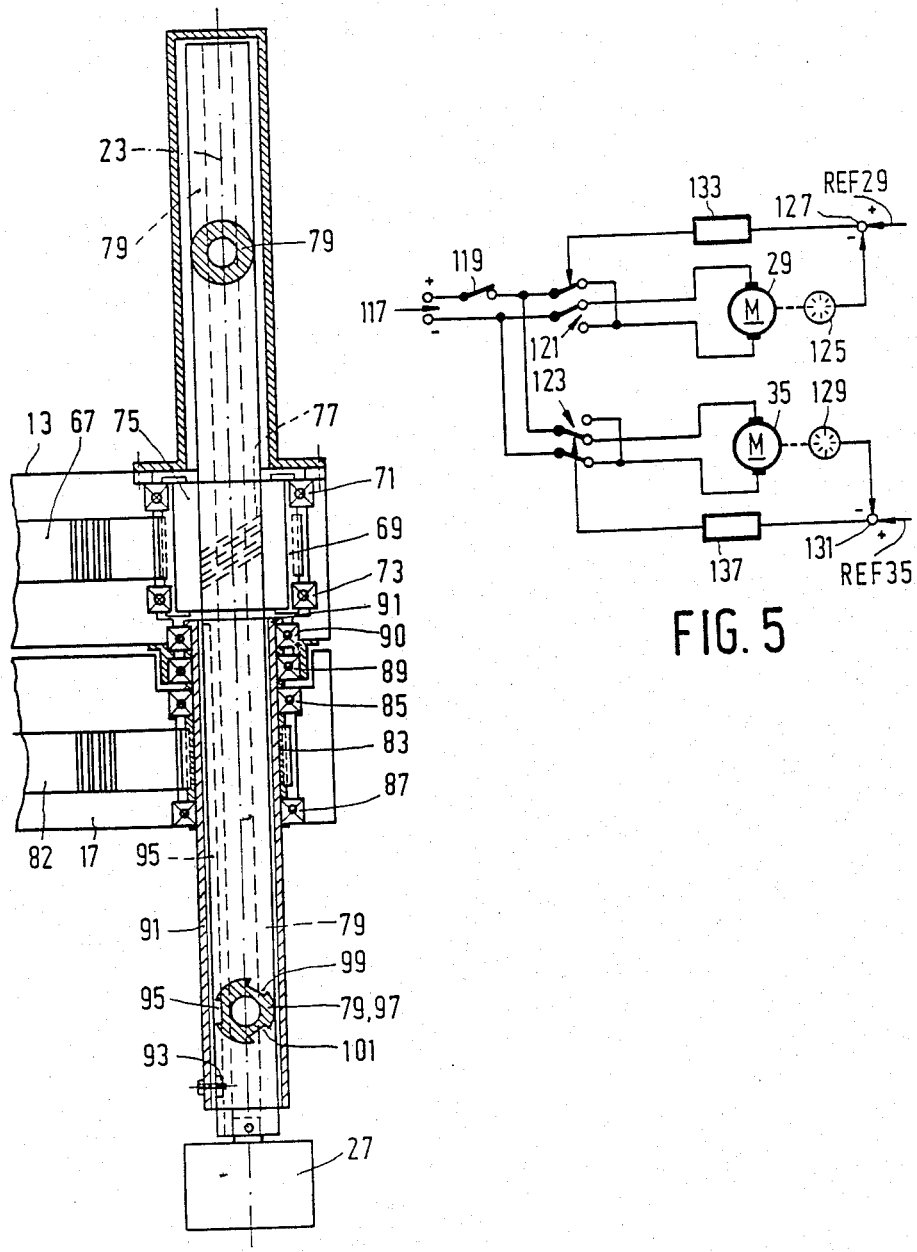

MANIPULATOR WITH ROD MECHANISM

This is a continuation of application Ser. No. 004,941, filed Jan. 20, 1987, now abandoned.

The invention relates to a manipulator comprising an end effector or tool holder which is displaceable by means of a rod mechanism comprising four displaceable arms, two of which are rotatable about a main axis by means of an individual drive for each of the said two arms, said main axis extending at right angles to the plane in which the displacement of at least two of the four arms of the rod mechanism is effected.

In a manipulator (robot) of the kind mentioned in the opening paragraph (known from the book by John Hartley: "Flexible Automation in Japan", published in 1984, p. 74–75, ISBN 3-540-13499-9, and from the brochure published in 1982 by Pentel Co. Ltd., Soka-City, Japan, Catalogue No. L' 82-10-3-000+, a comparatively long so-called hind-arm and a comparatively short so-called forearm forming part of the rod mechanism are driven by individual motors, whose position invariably lies on the side of a vertical column facing the end effector. The central axis of this column forms the said main axis of the manipulator. In order that the whole banana-shaped working space can be covered, the two sequentially or simultaneously energizable direct-current motors have to be driven at unequal angular speeds. One motor serves solely for the absolute rotation of the hind-arm, while the other motor serves solely for the relative rotation of the forearm with respect to the hind-arm.

Due to the fact that in the known manipulator the whole mass of the rod mechanism, the motors, the suspension yoke of the motors, the end effector and the load acts upon the column from one side, the column must be of comparatively heavy construction because of the comparatively large bending moments exerted thereon. Furthermore, the power of the motor coupled to the hindarm must be comparatively high because the whole mass of the rod mechanism, the motors, the end effector, the suspension yoke of the motors and the load is displaced thereby. Finally, it is to be noted that the computer program required for the desired movements is comparatively complicated. This is due to the fact that for positioning the end effector cylinder coordinates cannot be used.

The invention has for its object to provide a manipulator with an optimum mass distribution and a comparatively low motor power, while a control program can be used which is based on cylinder coordinates.

For this purpose, the invention is characterized in that the manipulator has a working space which is annular in a cross-section perpendicular to the main axis, the two arms which are rotatable about the main axis of being of equal length, and the simultaneously activated individual drives for these arms, integrated in a differential drive, producing at equal and oppositely directed angular velocities of the two arms about the main axis a radial displacement of the end effector with respect to the main axis, and producing at equal angular velocities of the two arms in the same direction about the main axis a circular displacement of the end effector about the main axis.

A particular embodiment of the manipulator which permits a rotation of the rod mechanism about the main axis of $2\pi$ radians altogether ($\pi$ radians in in clockwise direction plus $\pi$ radians in counterclockwise direction) and thus permits the use of a tubular working space without being impeded by the connections required for the drives, is further characterized in that each of the two driven arms of equal length is secured to an individual electric motor which is rotatable about the main axis and is coupled by a pinion to a fixedly arranged toothed ring, whose axis coincides with the main axis.

A further embodiment of the manipulator in which a rotation or translation of the end effector with respect to the rod mechanism is obtained in a simple manner without the required driving mechanism endangering the operator, is characterized in that at least one of the two arms of equal length located near the main axis has secured on it an electic motor, of which an output shaft is coupled to the end effector by a first toothed belt arranged within a first tubular arm and a second toothed belt arranged within a second tubular arm, the first arm being rotatable with respect to the second arm by means of a pivot shaft whose axis is parallel to the main axis and on which first and second pulleys are secured for coupling the movements of the first and second toothed belts.

A still further embodiment of the manipulator with drives which can be controlled in a comparatively simple manner and are insensitive to disturbances is further characterized in that the differential drive comprises two simultaneously controllable electric motors having the same electrical and mechanical power, one motor being mechanically coupled to one arm of the rod mechanism located near the main axis, while the other arm of the rod mechanisms located near the main axis is mechanically coupled to the other motor.

A further embodiment of the manipulator with a comparatively simple and inexpensive differential drive is further characterized in that the motors are identical direct-current motors which are supplied from the same current source by individual change-over switches, whereby for the circular displacement of the end effector and in a position of different polarities of the change-over switches the motors are energized in opposite senses, while for the radial displacement of the end effector and in a position of equal polarities of the change-over switches the motors are energized in the same sense.

The invention will be described more fully with reference to the drawings, in which:

FIG. 4 is a sectional view of the drive of the end effector in the manipulator shown in FIG. 1, and FIG. 5 shows a block circuit diagram of a part of the differential drive in the manipulator shown in FIG. 1.

Figure 1:
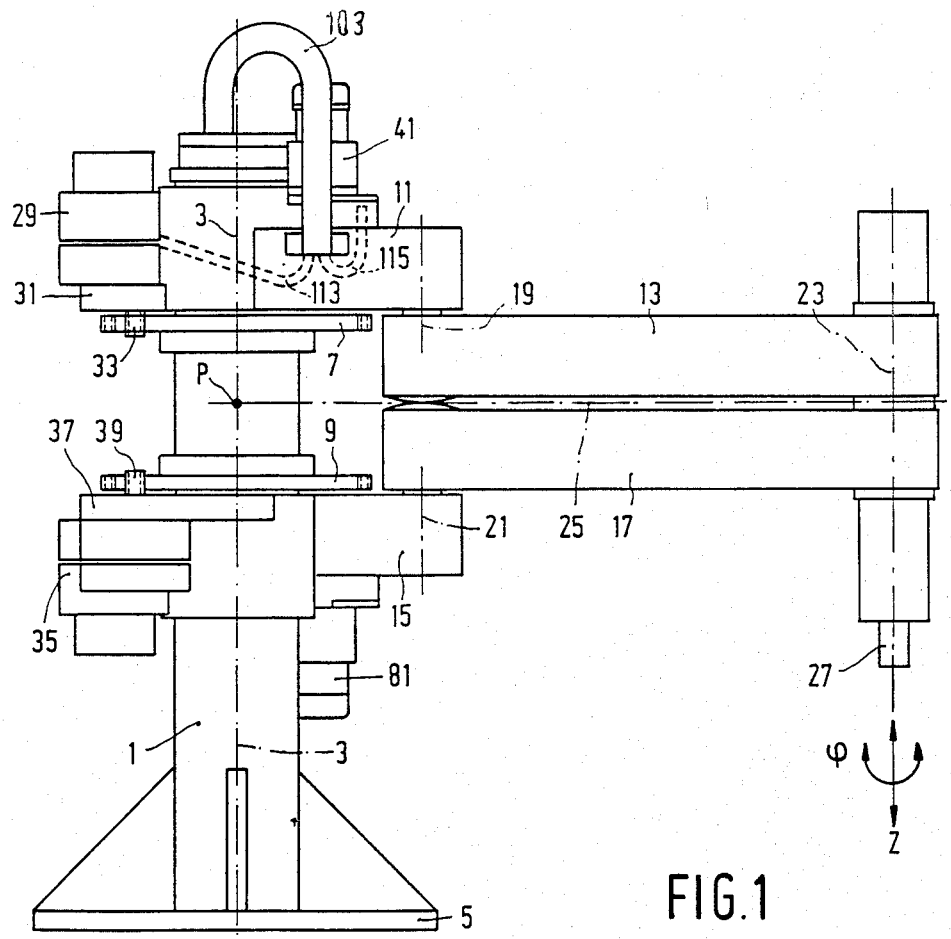
FIG. 1 is a side elevation of a particular embodiment of the manipulator.

The manipulator shown in FIG. 1 comprises a vertical supporting column 1, the centre line of which forms a vertical main axis 3. The column 1 has a socle 5 by which the manipulator can be secured on a usual support not shown in FIG. 1. The column 1 has secured to it a first toothed ring 7 fixedly arranged in a horizontal plane at right angles to the main axis 3. At a certain distance below the first, toothed ring 7, a second fixedly arranged toothed ring 9 is secured to the column 1. The toothed ring 9 is identical to the toothed ring 7 and is also situated in a horizontal plane at right angles to the main axis 3. The manipulator comprises a rod mechanism which is constituted by four pivotably rods in the form of tubular arms 11, 13, 15 and 17 (cf. also FIG. 2). The arm 13 is rotatable with respect to the arm 11 about a vertical pivotal axis 19, while the arm 11 is rotatable about the main axis 3 in a manner to be described more fully hereinafter. The arm 17 is also rotatable with respect to the arm 15 about a vertical pivotal axis 21, while the arm 15 is rotatable about the main axis 3 in a manner to be described more fully. The arm 13 is rotatable, with respect to the arm 17 about a vertical pivotal axis 23. Of the rod mechanism constituted by the four arms 11, 13, 15 and 17, the arms 11 and 15 (hind-arms) are of equal length and comparatively short with respect to the relatively long arms 13 and 17 (forearms) which are also of equal length. A diagonal line 25 of the rod mechanism located i na horizontal plane and extending radially with respect to the main axis 3 intersects the main axis 3 in a point P. All the arms 11, 13, 15 and 17 are located and displaceable in horizontal planes at right angles to the main axis 3. An end effector or tool holder 27 shown diagrammatically in FIG. 1 (for example a gripper) is suspended from the arms 13 and 17. The end effector 27 is rotatable ($\phi$) about the pivotal axis 23 and can be displaced vertically (Z) with respect to the arms 13 and 17 parallel to the main axis 3 in a manner to be described more fully hereinafter.

The arm 11 has secured on it a direct-current motor 29 with a mechanical transmission 31, of which a pinion 33 meshes with the fixedly arranged toothed ring 7. The arm 15 also has secured on it a direct-current motor 35 with a mechanical transmission 37, of which a pinion 39 meshes with the fixedly arranged toothed ring 9. The motors 29 and 35 are identical, as also are the mechanical transmissions 31 and 37 and the pinions 33 and 39. The arm 11 is rotatable by means of a pipe-shaped platform 44 secured thereto and supported by ball-bearings 40 and 42 about the column 1 and the main axis 3 (cf. FIG. 3). The motor 29 is mounted on the platform 44. The motor 35 is rotatable is the same manner as the motor 29 about the main axis 3. As can be seen in FIG. 3, an electric motor 41 with a mechanical transmission 43 is further secured on the arm 11. The motor 41 is arranged as close as possible to the main axis 3 in order to reduce the mass inertia and also the bending moment exerted on the column 1. The rod mechanism is rotated in FIG. 3 along a circular path through an angle $\alpha$ (cf. FIG. 2) with respect to the position in FIG. 2. The transmission 43 has a driving shaft 47 which is journalled in the arm 11 by means of a ballbearing 45 and on which a toothed pulley 49 is secured. A first toothed belt 51 couples the pulley 49 to a toothed pulley 53, which is secured on a hollow pivot shaft 55, which is rotatably journalled in the arms 11 and 13 by means of ball-bearings 57, 59 and ball-bearings 61, 63, respectively. On the pivot shaft 55 is secured a further toothed pulley 65, which is coupled through a second toothed belt 67 to a toothed pulley 69 (cf. FIG. 4). The pivot shaft 55 consequently acts on the one hand as pivotal connection between the arms 11 and 13 and on the other hand as a coupling between the first toothed belt 51 and the second toothed belt 67. The second toothed belt 67 meshes with the toothed pulley 69, which is supported by ball-bearings 71 and 73 so that together with a nut 75 the pulley 69 is rotatable relative to the arm 13 about the axis 23 (cf. FIG. 4). The ball-bearings 71 and 73 are supported in the arm 13. By means of its internal screw-thread 77, the nut 75 meshes an externally threaded (not shown in FIG. 4) hollow rod 79, which is displaceable with an axial translatory movement along the pivotal axis 23. During translation of the rod 79 the nut 75 does not move in the vertical direction. The motor 41 thus effects a translatory movement of the end effector 27, which is secured to the rod 79, along the pivotal axis 23.

Figure 2:
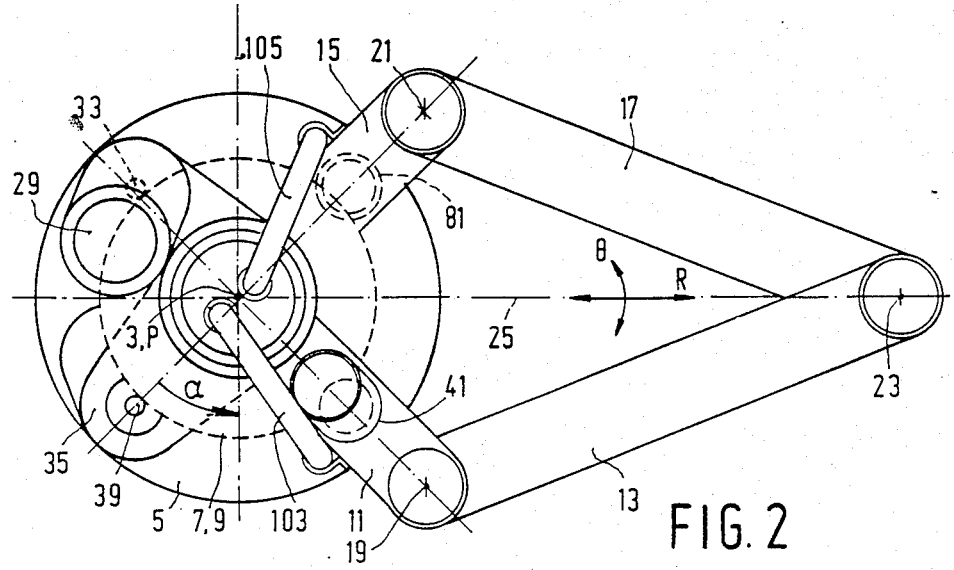
FIG. 2 is a plan view of the manipulator shown in FIG. 1.
Figure 3:
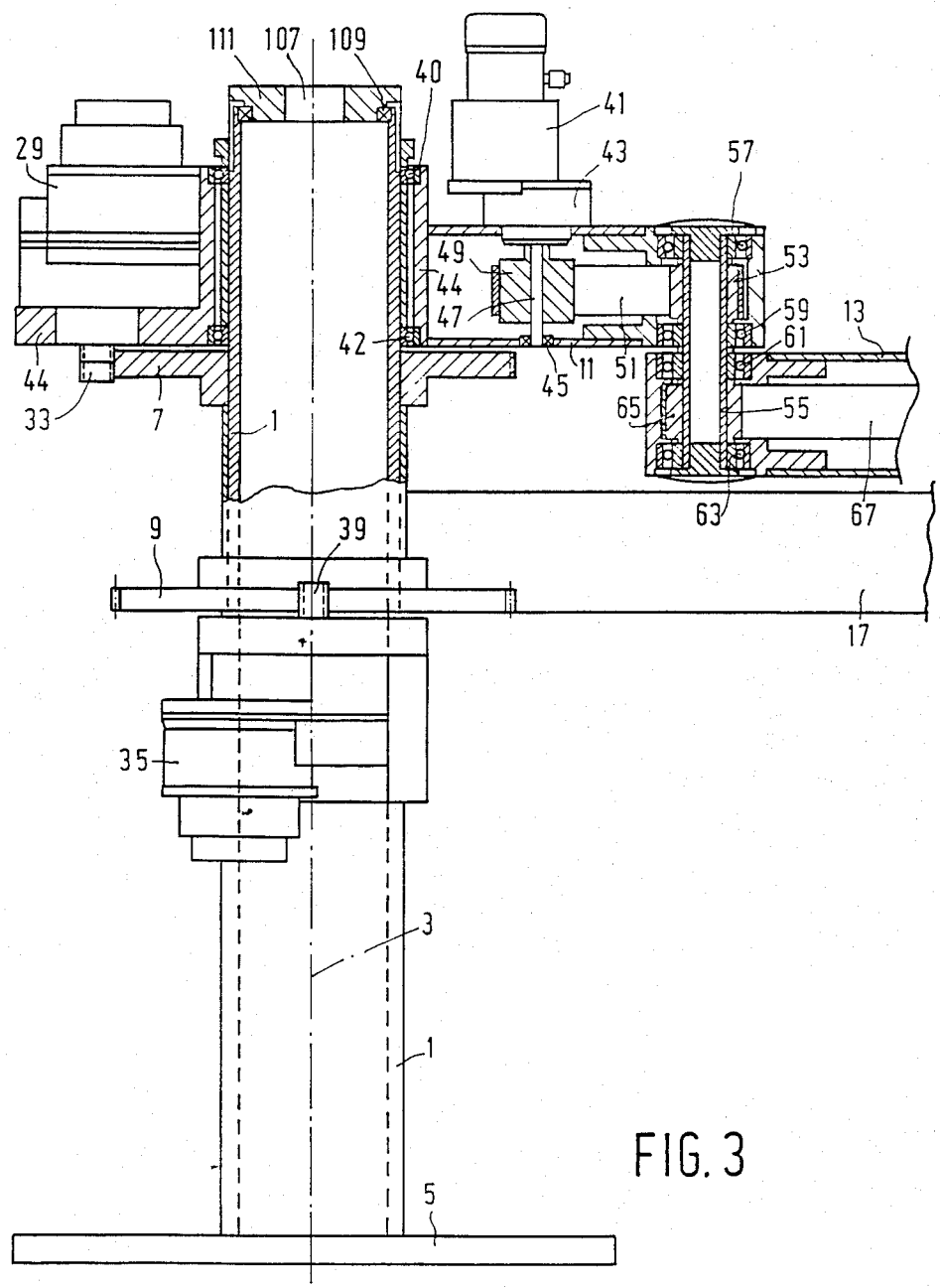
FIG. 3 is a side elevation, partly in section and drawn to an enlarged scale, of a part of the manipulator shown in FIGS. 1 and 2.

As can be seen in FIG. 2, the arm 15 has secured on it an electric motor 81 (cf. also FIG. 1) which, in a manner similar to that in which the electric motor 41 is coupled to the toothed pulley 69, is coupled by two toothed belts to a toothed pulley 83. One of the two toothed belts used for this purpose, namely the toothed belt 82, is shown in FIG. 4. A sleeve 91 is supported together with the pulley 83 by ball-bearings 85 and 87 in the arm 17 so as to be rotatable relative to the arm 17 about the axis 23. The sleeve 91 is provided internally with three rollers, of which only one roller 93 is shown in FIG. 4. The roller 93 engages in a longitudinally extending groove 95 in the wall of the hollow rod 79. As is indicated in a cross-section 97 at right angles to the pivotal axis 23, the wall of the rod 79 has two further longitudinally extending grooves 99 and 101, in which engage the other two rollers (not shown) on the sleeve 91. Upon rotation of the pulley 83 about the pivotal axis 23, a rotary movement is transmitted by the sleeve 91 by the roller 93 and the two rollers not shown to the rod 79 and the end effector or tool holder 27 secured thereto. In order to prevent the nut 75 from being moved axially by the rotation of the rod 79, upon energization of the motor 81 the motor 41 is also energized and a rotation of the pulley 69 secured to the nut 75 is produced by the toothed belts 51 and 67. The translatory movement of the end effector 27 is therefore independent of the rotary movement of the end effector 27. The arm 13 is rotatable with respect to the arm 17 by ball-bearings 89 and 90.

The so-called R (radial) displacement and $\theta$ (angular) displacement of the end effector 27 indicated by the arrows in FIG. 2 are effected by means of a differential drive which, besides the (electro)mechanical part already described with the motors 29 and 35, further comprises an electrical part in the form of the control circuit shown in FIG. 5. The wiring for the power supply to the motors 29, 35, 41 and 81 is located mainly in the column 1 but for the sake of simplicity this is not shown in FIGS. 1, 2 and 3. The wiring comprises a cable harness 103 for the motors 29 and 41 and a cable harness 105 for the motors 35 and 81. The cable harness 103 and 105 pass from the column 1 through an opening 107 in a cover 111 which is rotatable relative to the column 1 by a ball-bearing 109 (cf. FIGS. 1, 2 and 3). The cable harness 103 has a connection 113 for the motor 29 and a connection 115 for the motor 41. The connections for the motors 35 and 81 are constructed in a similar manner. Due to the described positioning of the motor connections, the rod mechanism can be displaced through an angle of $\pi$ radians in clockwise and counterclockwise directions without being impeded by the electrical connections. These connections are moveover situated for the major part in the column 1 and the tubular arms 11 and 15. The motors 29 and 35 are mounted on the arms 11 and 15 in such a manner that the pinions 33 and 39 face each other so that with an energization of equal polarity of the motors the arms move towards each other or away from each other for the radial displacement of the end effector 27. The circular displacement of the end effector 27 is obtained with an energization of different polarity of the motors 29 and 35. As those skilled in the art will understand movements of arms 11 and 15 at different speeds will result in movements of tool holder 27 with both radial and rotational components.

The control circuit shown in FIG. 5 for the motors 29 and 35 comprises a direct-current source 117, which can be connected through a main switch 119 and two double pole change-over switches 121 and 123 to the motors 29 and 35. The motor 29 is connected through an angle sensor 125 to a comparator 127, while the motor 35 is connected through an angle sensor 129 to a comparator 131. Through a process controller 133 the comparator 127 is coupled to the double pole change-over switch 121. In a similar manner, the comparator 131 is connected through a process controller 137 to the double pole change-over switch 123. A reference value REF29 for the motor 29 is supplied to the comparator 127, while a reference value REF 35 for the motor 35 is supplied to the comparator 131. The reference values REF29 and REF35 determine the desired position of the end effector 27 in the radial (R) direction and in the circular ($\theta$) direction. A similar control circuit for the motors 41 (Z direction) and 81 ($\phi$ direction) is not described for the sake of simplicity.

It should be noted that the sign (positive or negative) of the reference values REF29 and REF 35 supplied to the comparators 127 and 131 determines the position of the switches 121 and 123 and hence the direction of rotation of the motors 29 and 35. The absolute value of the references REF29 and REF35 is equal under all circumstances. For the sake of simplicity, the usual data processors for converting the signals of the angle sensors 125 and 129 are not shown in FIG. 5.

Instead of the electric motors 29, 35, 41 and 81, pneumatic or hydraulic motors may also be used. The motors 41 and 81 may be dispensed with if for simple applications no Z and/or $\phi$ movement of the end effector 27 is required. The rod mechanism may be constructed as a parallelelogram mechanism, in which all arms 11, 13, 15 and 17 have the same length. An additional displacement in the direction of the Z-axis is possible by arranging the column 1 so as to be displaceable in the vertical direction by any convenient means, for example by means of a further column, along which the column 1 is displaceable in a telescopic manner. The manipulator described may also be suspended from an overhead support. It should be noted that, although in the above description the working space has always been assumed to be annular (in cross-section) or tubular, the working space may also comprise a section of a ring or a tube. The term "annular" or "tubular" is consequently to be interpreted here in a wide sense. Due to the shape of the working space, the orientation of the manipulator is no longer dependent upon its surroundings and a large freedom is obtained for mounting the manipulator. Although the manipulator has been described with reference to a particular embodiment with an optimum mass distribution with respect to the column 1 by securing the motors 41 and 81 near the column 1 on the arms 11 and 15, the motors 41 and 81 may also be arranged at the end of the arms 13 and 15 above the end effector 27. However, the weight distribution is then less favourable. The described arrangement of the motors guarantees a comparatively small mass inertia moment of the manipulator. A comparatively high rigidity is obtained in that the rod mechanism is of double construction. More particularly, the torsional stiffness is comparatively high due to the double rod mechanism. The manipulator is comparatively safe due to the fact that the wiring is for the major part arranged internally in spite of the comparatively large angle of rotation of the arms. In the present case, this angle of rotation of the arms 11 and 15 for the $\theta$ (circular) movement is equal to $\pi$ radians in the clockwise direction and in the counterclockwise direction and for the R-(radial) movement equal to $\pm \pi/4$ radians. With the $\theta$-movement, the wiring in the column 1 rotates through $\pm \pi$ radians and takes along the cover 111 (cf. FIG. 3). The wiring is then twisted in the column 1. The toothed rings 7 and 9 may also be arranged so as to be rotatable with respect to the column 1. In this case, the arms 11 and 15 are secured to the toothed rings 7 and 9, while the motors 29 and 35 are fixedly arranged by securing them to the column 1. The angle of rotation of the arms 11 and 15 can then be less large, however, due to the wiring.

Due to the fact that the R-movement and the $\theta$-movement are obtained with both motors 29 and 35, the power required is halved. Therefore, the motors may be of lighter construction. Since the motors 29 and 35 are identical, a strongly modular construction is obtained. The manipulator as a whole is also highly modular due to the comparatively large number of identical parts. Moreover, the construction is symmetrical and hence very simple. Therefore, the manufacture, mounting and maintenance of the manipulaator are considerably simplified. Mass production of a comparatively inexpensive manipulator especially for assembling applications is possible. Due to the rigid construction balanced to the optimum, a comparatively high absolute accuracy and repetition accuracy for positioning the end effector have become attainable. Finally, it should be noted that the coordinate transformation with cylinder coordinates required for programming the control processor of the manipulator permits a comparatively rapid and inexpensive control.

What is claimed is:

1. A manipulator comprising a rod mechanism with four arms which are pivotable with respect to each other about a plurality of axes, first and second of said arms being of the same length, separate drive means for each of said first and second of said arms for rotating its associated arm about a main axis each independent of the other, said main axis extending parallel to the axes about which said arms are pivotable and perpendicular to the plane in which each of said arms pivots, a tool holder, third and fourth of said arms each with one end pivotably connected to said first and second arms respectively, said third and fourth arms being of the same length and being pivotably movable with respect to each other at their other ends opposite said one ends about an axis parallel to said main axis, said other ends supporting said tool holder, said first and second arms producing movement of said tool holder radially with respect to said main axis when their drive means drive them with oppositely directed angular velocities about the main axis, said first and second arms producing rotational movement of said tool holder with respect to the main axis when their drive means drive them with angular velocities about the main axis in the same direction, and parallel drive means for moving said tool holder in directions along the axis about which said third and fourth arms pivot independent of movement of any of said arms, said drive means for said first and second arms including an individual electric motor secured to each associated arm, each said motor being rotatable, an associated pinion driven by each said motor when said motor is rotated and an associated toothed ring cooperating with each said pinion for moving its associated arm, each said ring having an axis coinciding with said main axis.

2. A manipulator as claimed in claim 1 wherein said parallel drive means includes a rod with threads along its length, a nut for turning on said threads, and operating means for turning said nut.

3. A manipulator as claimed in claim 2 wherein said operating means includes a motor on said second arm, first pulley means driven by said motor, a first toothed belt driven by said first pulley means, a second toothed belt, second pulley means driven by said first toothed belt for driving said second toothed belt and third pulley means driven by said second toothed belt for turning said nut.

4. A manipulator as claimed in claim 3 including a further motor on said first arm, a third toothed belt driven by said further motor and fourth pulley means driven by said third toothed belt for rotating said threaded rod.

5. A manipulator as claimed in claim 4 wherein said arms are hollow and said first toothed belt is in said second arm, said second toothed belt is in said fourth arm and said third toothed belt is in said third arm.

* * * * *